United States Patent
Park et al.

(10) Patent No.: US 10,247,626 B2
(45) Date of Patent: Apr. 2, 2019

(54) MOTION RECOGNITION METHOD AND APPARATUS

(71) Applicant: SAMSUNG ELECTRONICS CO., LTD., Suwon-si (KR)

(72) Inventors: Gyu-tae Park, Seoul (KR); Seok-myong Kang, Hwaseong-si (KR); Tae-ho Kim, Suwon-si (KR); Yeon-woo Lee, Yongin-si (KR); Won-il Kim, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 644 days.

(21) Appl. No.: 14/446,535

(22) Filed: Jul. 30, 2014

(65) Prior Publication Data
US 2015/0039259 A1 Feb. 5, 2015

(30) Foreign Application Priority Data
Aug. 5, 2013 (KR) .................. 10-2013-0092631

(51) Int. Cl.
| | |
|---|---|
| *G01L 1/00* | (2006.01) |
| *H04N 21/422* | (2011.01) |
| *H04N 21/4223* | (2011.01) |
| *H04N 21/44* | (2011.01) |
| *H04N 21/442* | (2011.01) |
| *H04N 21/478* | (2011.01) |

(Continued)

(52) U.S. Cl.
CPC .............. *G01L 1/00* (2013.01); *A63F 13/213* (2014.09); *A63F 13/214* (2014.09); *A63F 13/428* (2014.09); *G06F 3/017* (2013.01); *G06F 3/0334* (2013.01); *H04N 21/422* (2013.01); *H04N 21/4223* (2013.01); *H04N 21/42202* (2013.01); *H04N 21/44008* (2013.01); *H04N 21/44218* (2013.01); *H04N 21/4781* (2013.01)

(58) Field of Classification Search
CPC ......................................................... G01L 1/00
USPC ......................................................... 702/139
See application file for complete search history.

(56) References Cited

U.S. PATENT DOCUMENTS

| | | | |
|---|---|---|---|
| 7,961,174 B1 | 6/2011 | Markovic et al. | |
| 8,284,157 B2 | 10/2012 | Markovic et al. | |

(Continued)

FOREIGN PATENT DOCUMENTS

| | | | | |
|---|---|---|---|---|
| EP | 1927947 A1 * | 6/2008 | ......... | G06K 9/00771 |
| JP | 08-112448 | 5/1996 | | |

(Continued)

OTHER PUBLICATIONS

International Search Report dated Dec. 10, 2014 issued in corresponding International Patent Application PCT/KR2014/007220.

*Primary Examiner* — Ricky Ngon
(74) *Attorney, Agent, or Firm* — Staas & Halsey LLP (57) ABSTRACT

A apparatus for recognizing a motion of an object is disclosed. The apparatus comprises a camera configured to photograph images of the object having the motion, a plurality of pressure and position sensors configured to be installed on a floor and to measure a floor contact position, a floor contact area and a floor contact pressure of the object and a motion analyzer configured to analyze the motion of the object by combining two or more among the images, floor contact position, floor contact area and floor contact pressure of the object.

18 Claims, 9 Drawing Sheets

(51) Int. Cl.
*G06F 3/01* (2006.01)
*G06F 3/033* (2013.01)
*A63F 13/428* (2014.01)
*A63F 13/213* (2014.01)
*A63F 13/214* (2014.01)

(56) References Cited

U.S. PATENT DOCUMENTS

| | | | |
|---|---|---|---|
| 2006/0001545 A1* | 1/2006 | Wolf | A47K 3/001 |
| | | | 340/573.1 |
| 2009/0119843 A1* | 5/2009 | Rodgers | A61B 5/1115 |
| | | | 5/611 |
| 2011/0260890 A1* | 10/2011 | Larsen | A63B 69/3667 |
| | | | 341/20 |
| 2012/0182271 A1 | 7/2012 | Wu et al. | |
| 2012/0304126 A1 | 11/2012 | Lavigne et al. | |

FOREIGN PATENT DOCUMENTS

| | | |
|---|---|---|
| JP | 2001-346901 | 12/2001 |
| JP | 2003-260263 | 9/2003 |
| JP | 4518926 | 5/2010 |
| KR | 10-2006-0128799 | 12/2006 |
| KR | 10-2006-0130535 | 12/2006 |
| KR | 10-0684961 | 2/2007 |
| KR | 10-0701041 | 3/2007 |
| KR | 10-2008-0073849 | 8/2008 |
| KR | 10-2010-0083902 | 7/2010 |
| KR | 10-2010-0119172 | 11/2010 |
| KR | 10-2011-0066264 | 6/2011 |
| KR | 10-1083689 | 11/2011 |
| KR | 10-2012-0097688 | 9/2012 |
| KR | 10-2012-0119351 | 10/2012 |

* cited by examiner

MOTION RECOGNITION METHOD AND APPARATUS

CROSS-REFERENCE TO RELATED APPLICATIONS

This application claims priority benefit from Korean Patent Application No. 10-2013-0092631, filed on Aug. 5, 2013 in the Korean Intellectual Property Office, the disclosure of which is incorporated herein by reference.

BACKGROUND

1. Field

Apparatuses and methods consistent with the exemplary embodiments relate to a method and apparatus for recognizing motion, and more particularly to a method and apparatus for sensing various motions of a user when a user is in motion while viewing a television (TV) or similar display device and allowing a user to interactively control a game or similar content.

2. Description of the Related Art

In general, a game or educational program has used a method of recognizing a user's motion while contents for the game or education are displayed on a display apparatus and allowing a user to control the contents based on the user's motion. Examples of a game console controlled using motion recognition include XBox® and Kinect® of Microsoft®, Playstation® Eyetoys® of Sony, and Wii® of Nintendo, etc.

XBox® and Kinect® recognize a user's motion and allow a game to be controlled trough motion capture without any controller. Such a control method based on the motion recognition of the game machine employs a three-dimensional (3D) depth sensor and a two-dimensional (2D) red, green, blue (RGB) image sensor to frontally recognize a human's activity such as gesture and motions using arms and a body.

Playstation® Eyetoys® is a color digital camera such as a webcam for Playstation®, which uses computer vision and gesture recognition for processing an image taken by the camera. This allows a player to interact with a game through motion, color detection and voice.

Wii® Fit® is game software used for health management, which measures a user's weight, degree of obesity, and balance of body through measurement of centroidal movement of the user's feet while the user remains stationary on a Wii® balance board.

Motion recognition technology in such game console is to remotely sense the motion and state of a human, which includes a method of using a 2D camera in front (Playstation®), a method of using a 2D or 3D depth camera (XBox® Kinect®), a method of grasping and moving a device with a hand (Wii®), etc. There is required a method of remotely sensing a human's natural motion without grasping the device.

While frontally sensing a human's activity, it is possible to recognize relative motion of hands and feet with respect to the body but it is difficult to accurately sense the motion of the feet.

In particular, the conventional motion recognition technology is difficult to measure absolute positions of a human's feet.

SUMMARY

Additional aspects and/or advantages will be set forth in part in the description which follows and, in part, will be apparent from the description, or may be learned by practice of the invention.

One or more exemplary embodiments may provide a method and apparatus for recognizing an object's motion through multifaceted sensing, in which a gesture and a foot motion can be accurately sensed by photographing the object's motion through a camera and measuring a floor contact position, a contact area and a contact pressure.

Another exemplary embodiment may provide a method and apparatus for recognizing an object's motion to be applicable to a content object (avatar) displayed on a display apparatus.

Still another exemplary embodiment may provide a method and apparatus for recognizing an object's motion to be applicable to a soccer game, a rope skipping game, etc. by simultaneously and effectively sensing a foot's absolute position and position change activity as well as a human's face, frontal face and body gesture.

According to an aspect of another exemplary embodiment, a method of recognizing a motion of an object is provided; the method including: photographing, by a camera, images of the object having the motion, measuring, by a plurality of pressure and position sensors installed on a floor, a floor contact position, floor contact area and floor contact pressure of the object and analyzing the motion of the object by combining two or more among the images, floor contact position, floor contact area and floor contact pressure of the object.

The plurality of pressure and position sensors may be arranged at predetermined intervals on a mattress.

The camera may be placed in a display apparatus.

The analyzing the motion may be performed in one of a computer, a server, and a display apparatus.

The analyzing the motion may be performed by combining two or more among changes in the images of the object, the floor contact position, the floor contact area, and the floor contact pressure over time.

The change in the floor contact position over time may be used in analyzing horizontal activity of the object.

The change in the floor contact area over time may be used in analyzing balance of the object.

The change in the floor contact pressure over time may be used in analyzing moved height of the object.

A result from analyzing the motion may be applied to an image of the measured object or a content object displayed on the display apparatus.

A result from analyzing the motion may be applied to one among measurement of an object's weight, face recognition, gesture recognition, measurement of moving speed, measurement of an exercising amount, and a game control signal.

According to an aspect of another exemplary embodiment, a apparatus for recognizing a motion of an object is provided; the apparatus comprising: a camera configured to photograph images of the object having the motion; a plurality of pressure and position sensors configured to be install on a floor and measure a floor contact position, floor contact area and floor contact pressure of the object; and a motion analyzer configured to analyze the motion of the object by combining two or more among the images, floor contact position, floor contact area and floor contact pressure of the object.

The plurality of pressure and position sensors may be arranged at predetermined intervals on a mattress.

The camera may be placed in a display apparatus.

The motion analyzer may be provided in one of a computer, a server, and a display apparatus.

The motion analyzer may analyze the motion by combining two or more among changes in the images of the object, the floor contact position, the floor contact area, and the floor contact pressure over time.

The change in the floor contact position over time may be used in analyzing horizontal activity of the object.

The change in the floor contact area over time may be used in analyzing balance of the object.

The change in the floor contact pressure over time may be used in analyzing moved height of the object.

A result from analyzing the motion may be applied to an image of the measured object or a content object displayed on the display apparatus.

A result from analyzing the motion may be applied to one among measurement of an object's weight, face recognition, gesture recognition, measurement of moving speed, measurement of an exercising amount, and a game control signal.

According to an aspect of another exemplary embodiment a motion analysis apparatus includes a first input unit to receive images of an object in motion, a second input unit to receive at least one of a floor contact position, a floor contact area and a floor contact pressure of the object; and an analyzer unit, to analyze, by way of the processor, the motion of the object by combining data received by the first input unit and the second input unit.

The analyzing of the motion of the object by the analyzer unit may include determining an amount or a type of physical exercise performed by the object.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings. The following embodiments describe only configurations directly related to the present inventive concept, and the descriptions the other configurations will be omitted. However, it will be understood that the omitted configurations are not unnecessary in realizing an apparatus or system to which the inventive concept is applied. Further, like numerals refer to like elements throughout.

Figure 1:
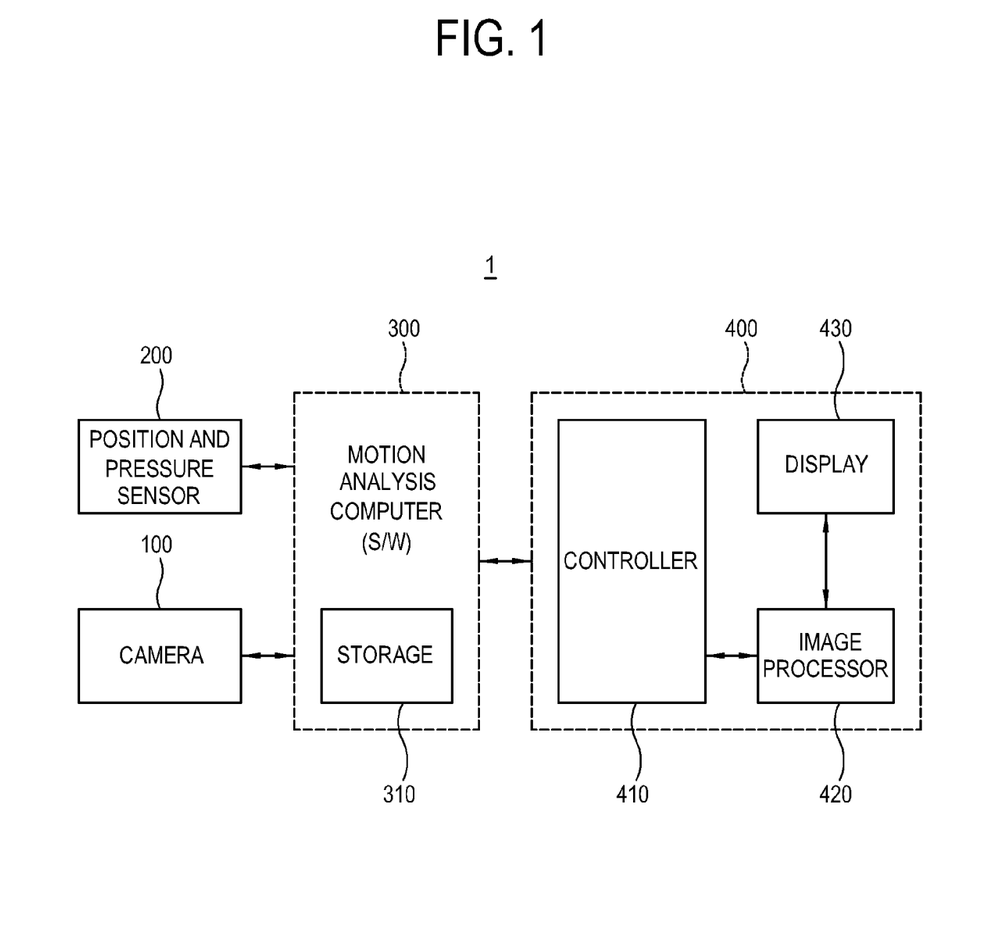
FIG. 1 is a block diagram of a motion recognition apparatus according to a first exemplary embodiment.

As shown in FIG. 1, a motion recognition apparatus 1 according to a first exemplary embodiment may include, for example, a camera 100, a position and pressure sensor 200, a motion analysis computer 300 and a display apparatus 400.

The camera 100 photographs a user's hand motion (e.g., a gesture) and body motion and generates a user's image. The user's motion image taken by the camera 100 is transmitted to the motion analysis computer 300. The camera 100 may include a webcam, a pan tilt camera, a digital camera, an analog camera, a camcorder, etc. The camera 100 may be separately provided and installed, or may be built-into the motion analysis computer 300. The camera 100 may be installed only in front, or many cameras 100 may be used to photograph a 2D or 3D image from various angles or view points other than the front.

Figure 5:
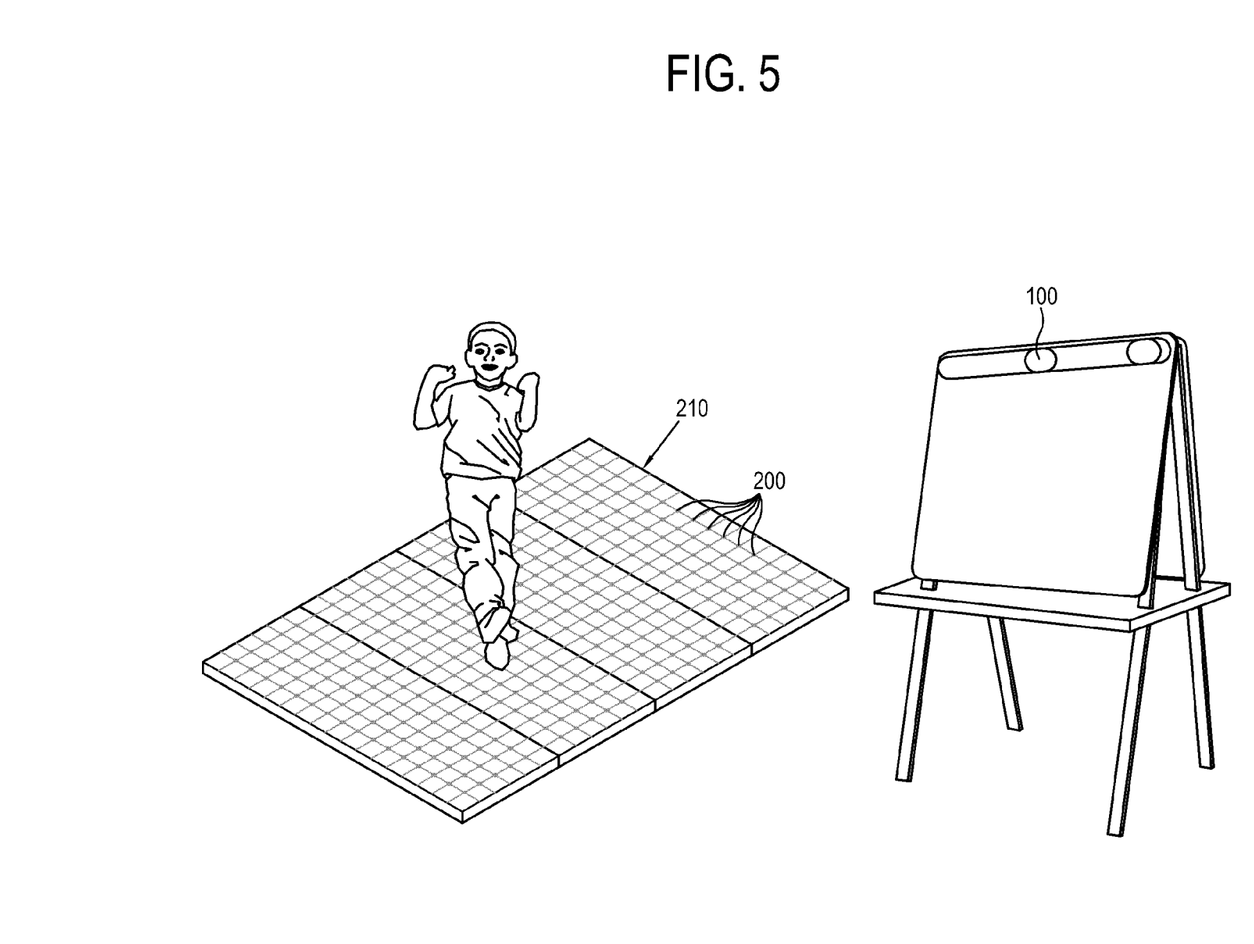
FIG. 5 is a schematic view showing the motion recognition apparatus according to an exemplary embodiment.

The position and pressure sensor 200 senses a contact position and a contact pressure of a user's foot, hand or body and transmits it to the motion analysis computer 300. The position and pressure sensor 200 may include a sensor that outputs a predetermined resistance, current or voltage values in proportion to applied force. As shown in FIG. 5, a plurality of pressure sensors 200 may be spaced apart from each other at a predetermined distance and arranged in the form of a matrix on a mat or mattress such as mattress 210. In an embodiment, the term mat or mattress may refer to a large pad or cushion used as a surface placed on the floor for exercise or other physical activity. The contact position is determined by coordinates on the mattress 210 of the pressure sensor 200 that a user contacts. Of course, the pressure sensor 200 can measure applied pressure. A user's contact area can be calculated as an area determined by measuring the contact positions over a predetermined period of time and connecting the outermost positions among the measured contact positions. In another embodiment, contact area may refer to the perimeter of the portion of the user's body making contact with or exerting a force on mattress 210.

The motion analysis computer 300 receives a user's motion image photographed by the camera and the contact position, the contact area and the contact pressure sensed by the position and pressure sensor 200, and analyzes a user's motion. The motion analysis computer 300 may be installed with motion analysis software (S/W). The motion analysis computer 300 may include a storage unit 310 for storing a motion analysis result, a central processing unit (CPU) or a microprocessor unit (MPU) (not shown), a wired/wireless communication unit (not shown), a data processing unit (not shown), etc.

The display apparatus 400 may include a controller 410, an image processor 420 for processing a user's motion analysis result from the motion analysis computer 300 to be displayed as an image, and a display unit 430 for displaying the image from the image processor 420. The image processor 420 may include an image processing board where any one or more of a resistor, a condenser, an integrated circuit (IC), a diode, a relay, a switch, a light emitting diode (LED), and the like may be mounted on to a printed circuit board (PCB) through processes of surface mounting technology (SMT).

Figure 2:
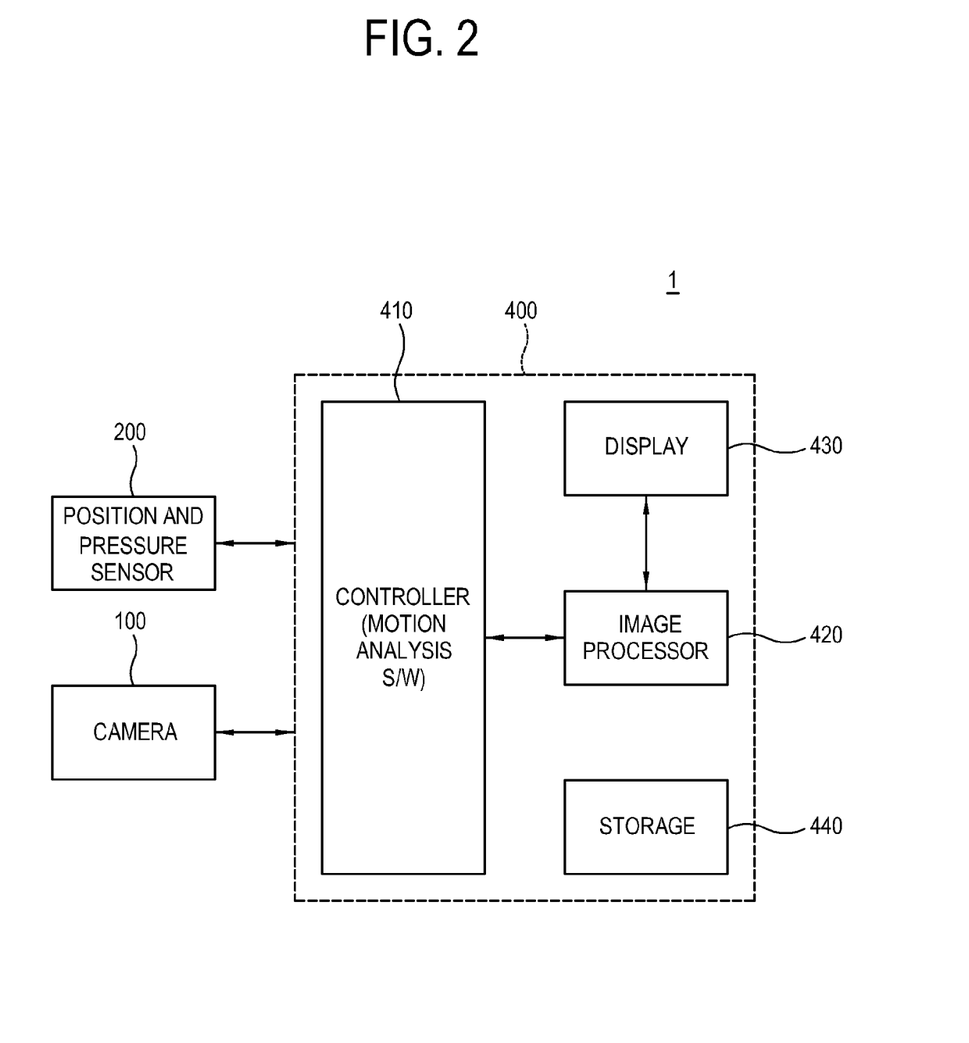
FIG. 2 is a block diagram of a motion recognition apparatus according to a second exemplary embodiment.

Referring to FIG. 2, the motion recognition apparatus 1 according to another exemplary embodiment may include, for example, the camera 100, the position and pressure sensor 200, and the display apparatus 400. The camera 100 and the position and pressure sensor 200 photographs images of a user's hand motion, body motion, foot motion and measures the contact position and contact pressure, thereby directly transmitting them to the display apparatus 400. The camera 100, and the position and pressure sensor 200 are similar to those of the motion analysis apparatus 1 according to the first exemplary embodiment, and therefore repetitive descriptions thereof will be avoided. The display apparatus 400 may include the controller 410 for performing motion analysis, and the storage unit 440 for storing the motion analysis result. The controller 410 may be installed with motion analysis software or may include a CPU or MPU (not shown) programmed to analyze the motion. The display apparatus 400 of the motion analysis apparatus 1 according to the second exemplary embodiment may have a user motion analysis function that is performed by the motion analysis computer 300 of FIG. 1.

Figure 3:
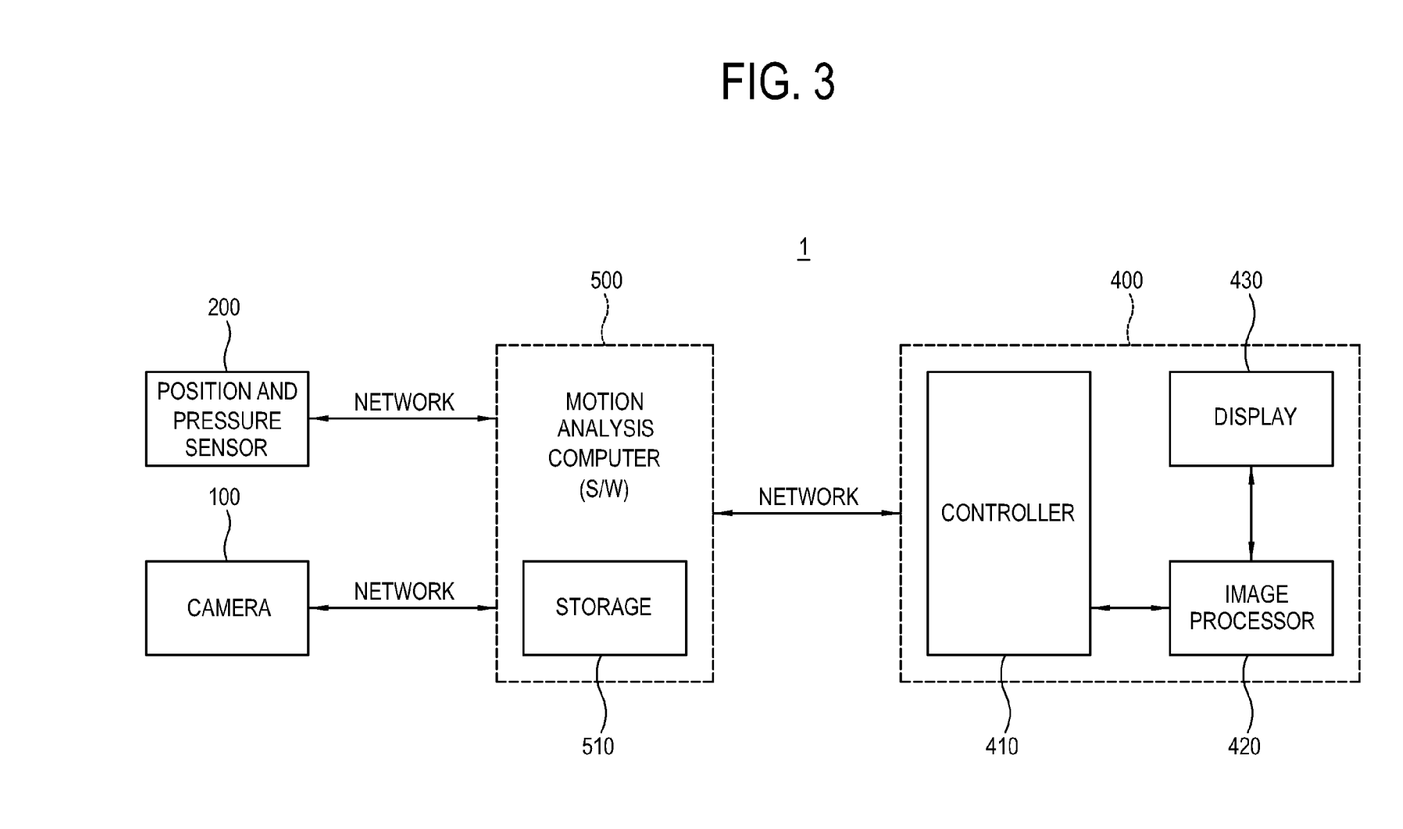
FIG. 3 is a block diagram of a motion recognition apparatus according to a third exemplary embodiment.

The motion analysis apparatus 1 according to another exemplary embodiment photographs images of a user's hand motion, body motion, and foot motion and measures the contact position and contact pressure, thereby transmitting them to a cloud server 500 through a network. The cloud server 500 performs the motion analysis based on the received photographed images of the user's hand motion, body motion and foot motion and the received contact position and pressure. The cloud server 500 may be installed with the motion analysis software, or include the CPU or MPU (not shown) programmed to analyze the motion. The cloud server 500 may include a storage unit 510 to store a motion analysis result. The cloud server 500 may transmit the motion analysis result to the display apparatus 400 through a network. The display apparatus 400 is similar to that of the motion analysis apparatus according to the first exemplary embodiment shown in FIG. 1, and thus repetitive descriptions thereof will be avoided.

Below, a method of analyzing a user's motion will be described in detail with reference to FIGS. 4 to 9.

Figure 4:
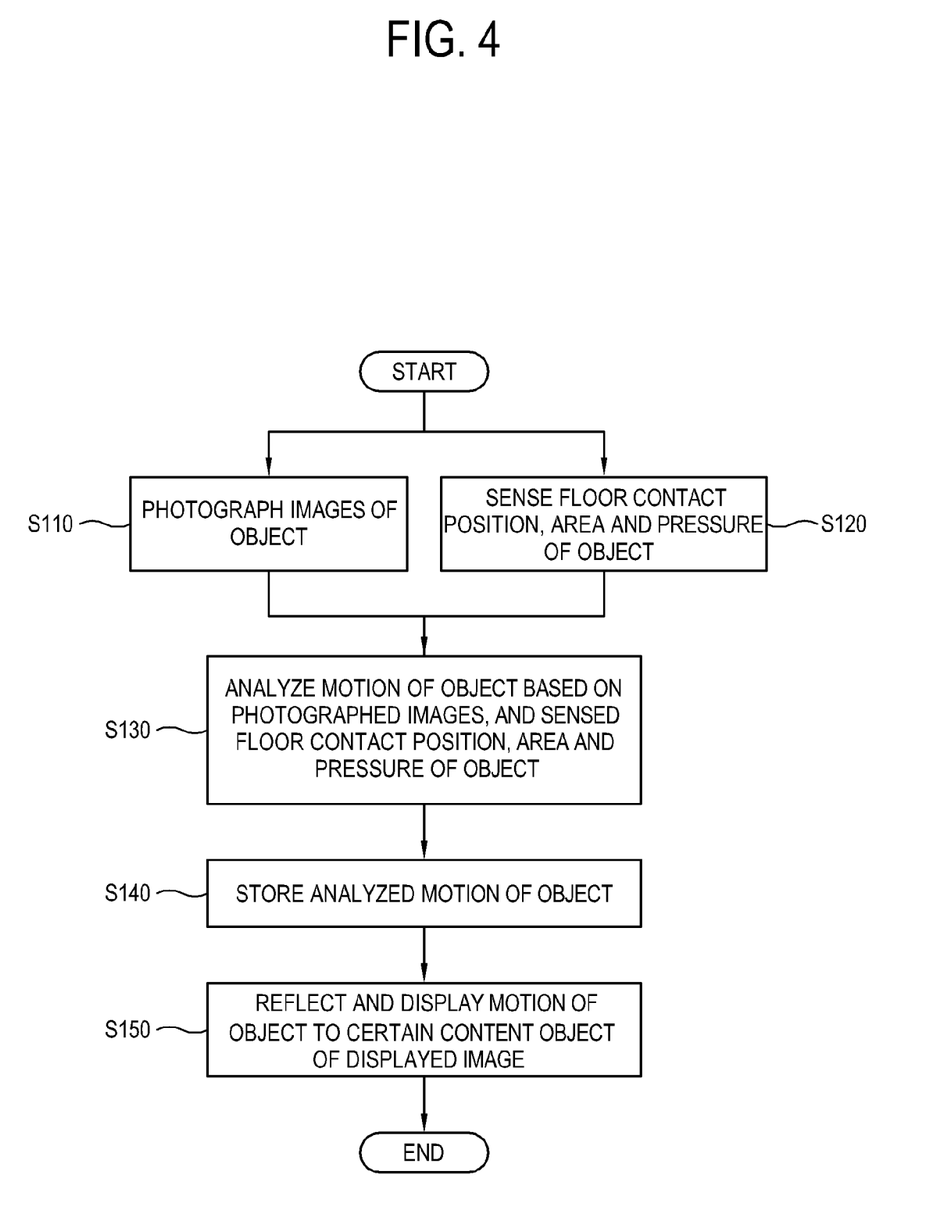
FIG. 4 is a flowchart showing a motion recognition method according to an exemplary embodiment.
Figure 6:
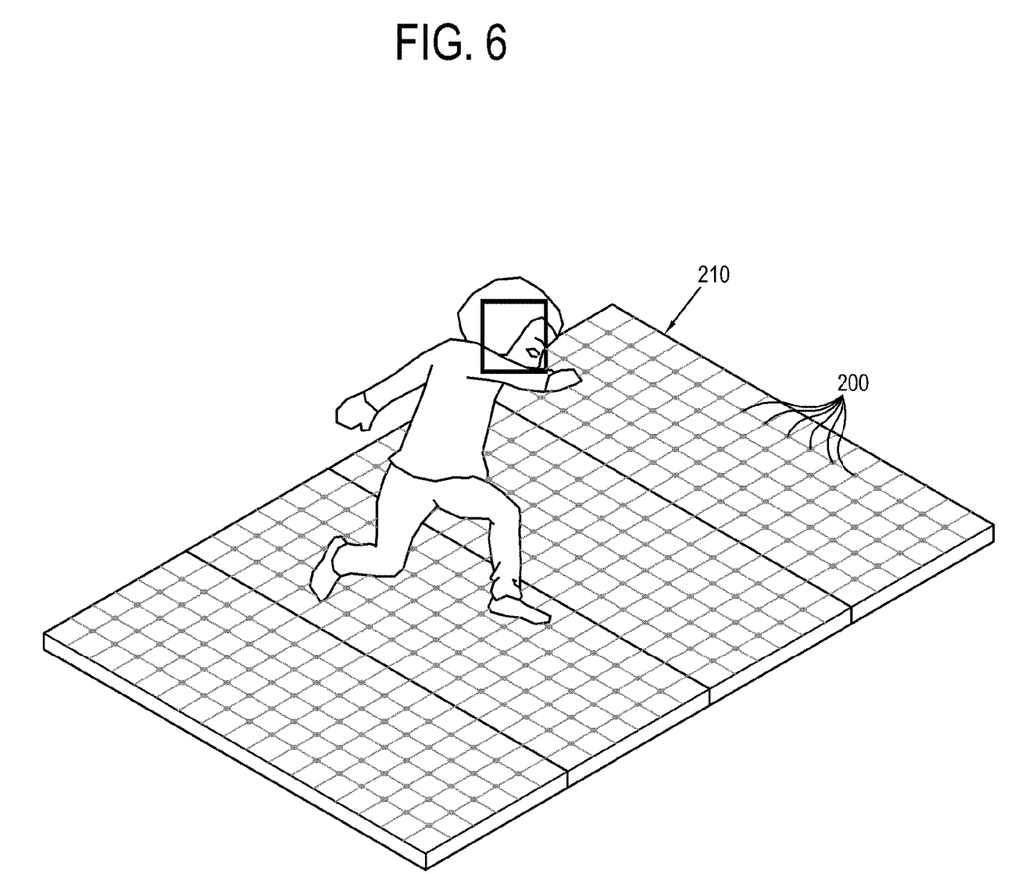
FIGS. 6, 7, 8, and 9 are views for explaining the motion recognition method according to an exemplary embodiment.

First, if a user makes a walking or running motion on the mattress 210, the camera 100 photographs his/her hand motion, body motion, and foot motion (S110 of FIG. 4). At this time, the camera 100 photographs a user's front (e.g., the user's frontal profile) and recognizes any gesture by the user. As shown in FIG. 6, the camera 100 photographs a user's face moving on the mattress 210 and identifies him/her. For example, in an embodiment, the user is identified by name by associating his or her identified face with face metrics stored in a database. One or more other embodiments allow identification and selection of user preferences stored in the database based on the face identification.

Figure 7:
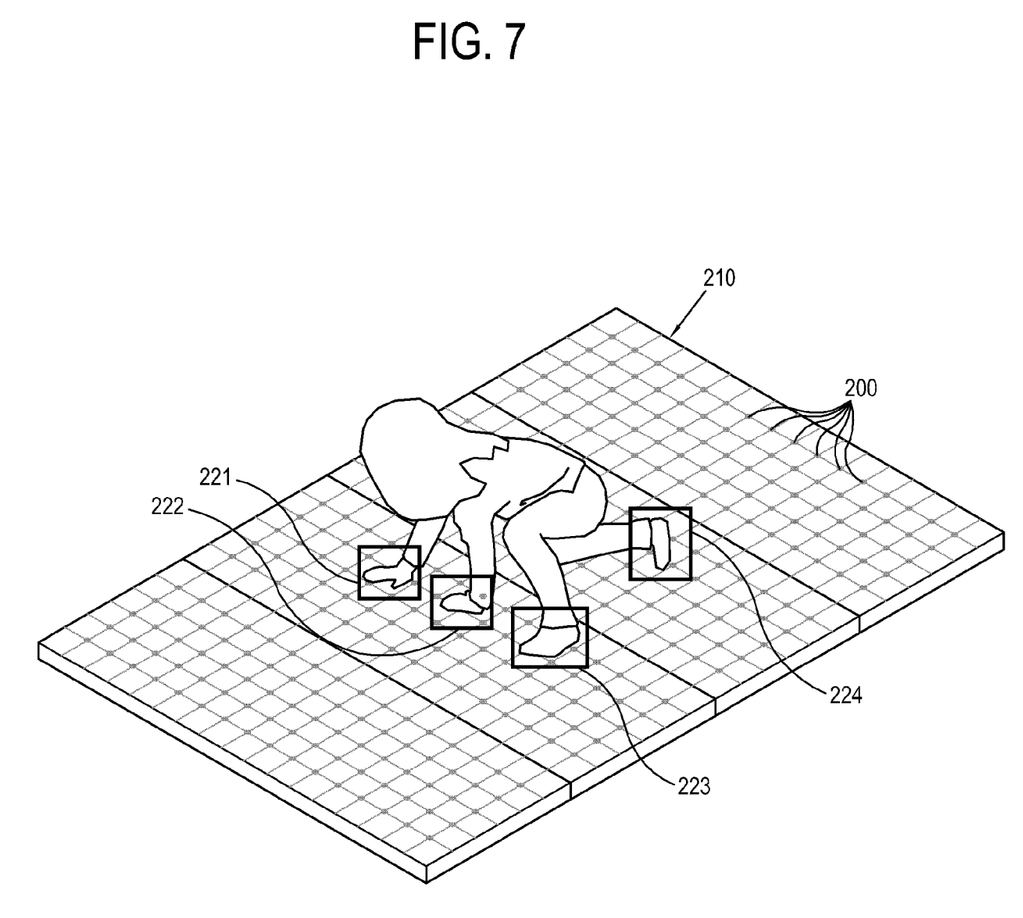

While a user walks or runs on the mattress 210, the user steps on the plurality of position and pressure sensors 200 arranged on the mattress 210. Through the plurality of position and pressure sensors 200 arranged on the mattress 210, a user's floor contact position, and the contact area and pressure are sensed (S120 of FIG. 4). The plurality of position and pressure sensors 200 can sense multiple points through mattress coordinates when a user contacts the mattress 210 with two hands 221 and 222 and two feet 223 and 224 as shown in FIG. 7, for example. At this time, the hand contact and the foot contact may be distinguished based on the images photographed by the camera or based on previously registered contact shapes. Also, it is possible to measure the amount of exercise and activity by identifying a user through the camera and measuring his/her weight through the position and pressure sensor 200.

A user's floor contact position, contact area and contact pressure sensed through the plurality of position and pressure sensors 200 may constantly vary while a user is in motion. Such variation in the user's floor contact position, contact area and contact pressure over time may be used to analyze a user's motion (S140 of FIG. 4). For example, variation in a user's floor contact position, contact area and contact pressure can be analyzed and applied to the image photographed by the camera 100 (S130 of FIG. 4). That is, variation in a user's floor contact position over time may indicate that a user's foot moves horizontally. That is, when a walking or running motion is recognized from the user's motion image photographed by the camera 100, variation in the foot contact position sensed on the floor may be applied to more accurately recognize the foot motion. The foot motion sensed by the plurality of position and pressure sensors 200 may then be used to supplement and enhance the walking or running motion information recognized from the user's motion image photographed by the camera 100.

As another example, when the plurality of position and pressure sensors 200 sense two hands 221 and 222 and two feet 223 and 224 contacting mattress 210 as shown in FIG. 7, and the motion information recognized from the user's motion image photographed by the camera 100 indicates that the user is in a plank-like position, the motion analysis computer 300 may use the information provided by the plurality of position and pressure sensors 200 to supplement the motion image of camera 100 and more accurately determine the user is in a push up position and doing pushups.

As still another example, when the plurality of position and pressure sensors 200 a repetitive jumping motion with the user's two feet and the motion information recognized from the user's motion image photographed by the camera 100 indicates that the user is in a X-shaped position, the motion analysis computer 300 may use the information provided by the plurality of position and pressure sensors 200 to supplement the motion image of camera 100 and more accurately determine the user is exercising by doing jumping jacks.

In the user's walking or running motion, a front sole and a back sole of a user's foot may contact the floor at different times and may result in a different contact time with the floor, and therefore the contact area may be sensed over time, thereby more accurately recognizing the walking or running motion based on leg joints. As described above, variation in the contact area and the contact pressure is sensed to thereby recognize a user's centroidal movement, e.g., balance on the mattress. Also, it is possible to recognize a jump height of a user, based on a pressure applied by the user.

Figure 8:
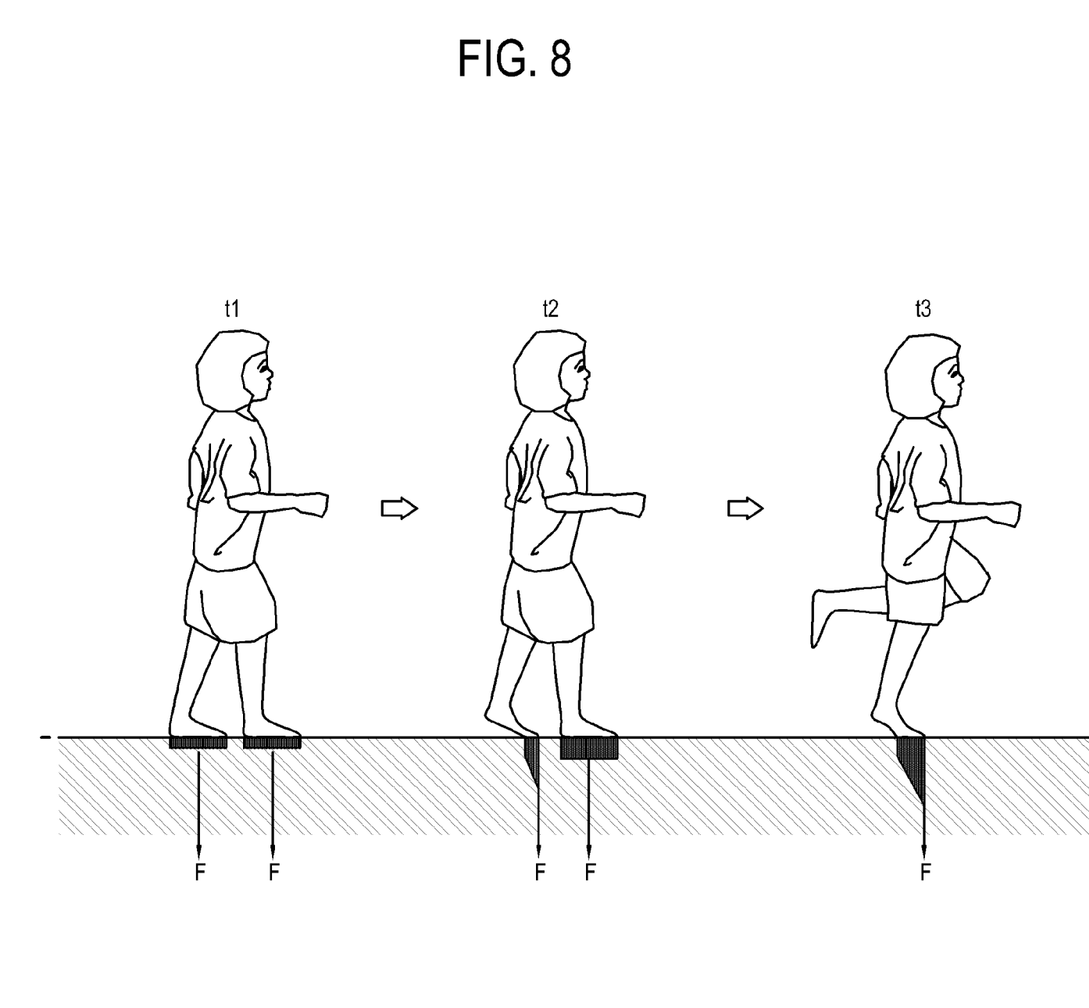

FIG. 8 shows an example in which the contact area and the contact pressure are varied depending on a user's motion. At time t1, a user applies balanced pressure F through his/her feet. At time t2 a user changes his/her motion to walk so that a user's weight can be generally focused on his/her front foot. With this motion, higher pressure is sensed in the front foot. On the other hand, lower pressure is sensed in a back foot since a back sole thereof is lifted and a front sole is in light contact with the floor. Then, at time t3 a user lifts up the back foot and stands on the front foot, but only on the front sole of the front foot rather than standing flat footed. At this time, all of the user's weight is focused on the front sole of the front foot. In this way, if variation in the contact area and pressure over time is analyzed, it is possible to analyze a user's walking or running motion. Of course, if both the analysis result based on the plurality of position and pressure sensors 200 and the images photographed by the camera 100 are used, it is possible to recognize a greater variety of motion more easily such as very natural motion and soft motion.

Figure 9:
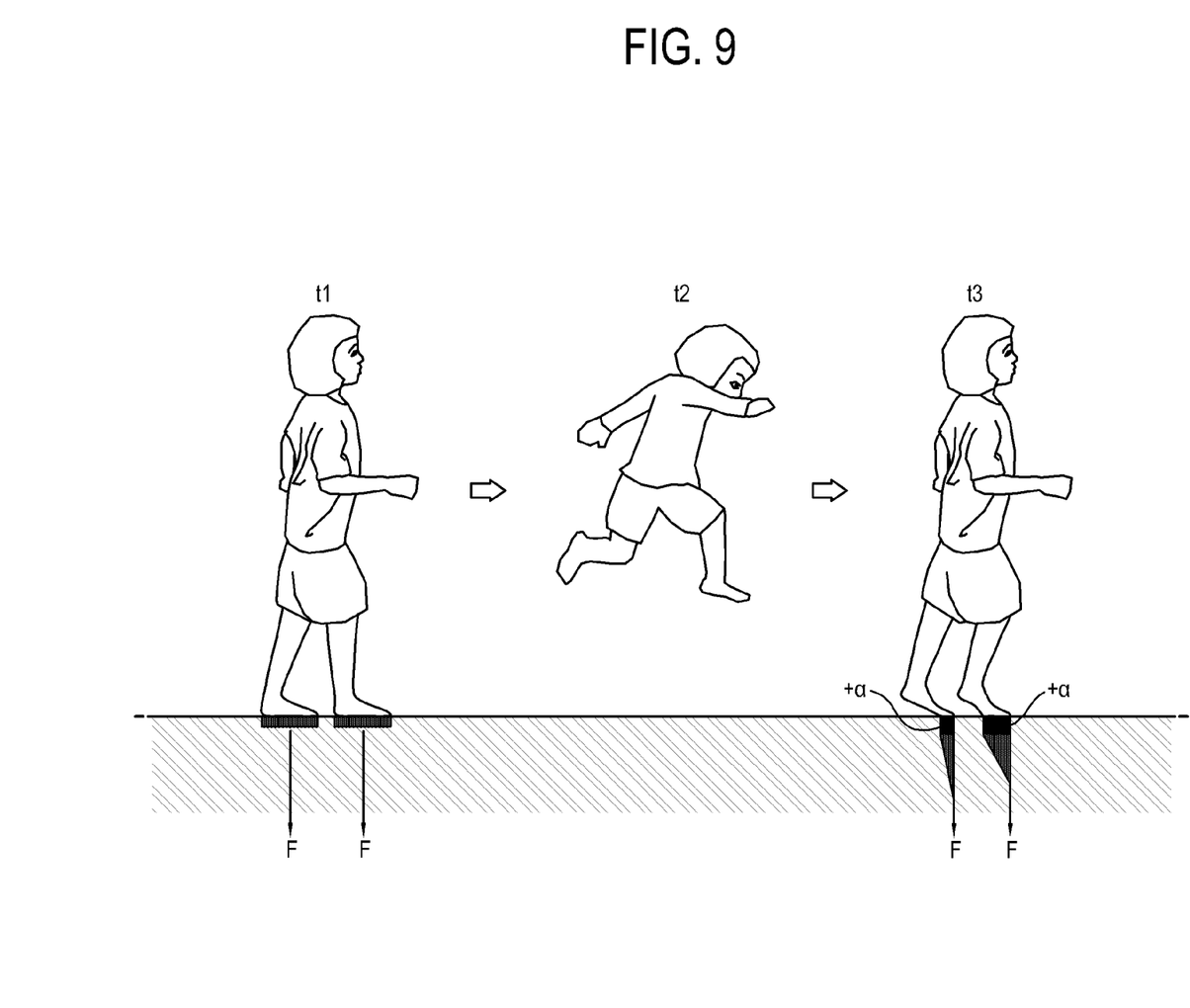

FIG. 9 shows another example in which the contact area and pressure of the foot is varied depending on a user's motion. At time t1, a user applies balanced pressure F through his/her feet. At time t2 a user jumps higher. With this jumping motion, a user's feet are not in contact with the floor, and thus no contact is sensed. At time t3 a user makes a landing after the jump, and thus a user applies pressure higher than that due to his/her weight because of a jump height. That is, the pressure a based on the acceleration of gravity is added due to the jump height. The pressure F applied when a user jumps and falls can be obtained by multiplying a user's weight m and the acceleration a of gravity together. Therefore, the acceleration of gravity can be obtained by subtracting the force due to the weight from the pressure F sensed at the time t3. Based on the acceleration of gravity, it is possible to measure a height at which a user jumped.

As described above, a user's motion analysis result is stored in the storage unit 310, 440, or 510 (S140 of FIG. 4).

Also, a user's motion analysis result may be applied to an object (for example, an avatar) of contents such as a game in the display apparatus 40 (S150). Alternatively, a user's motion analysis result may be used as a control signal for a sports game such as a soccer, a baseball, etc. or a rope skipping game, based on the user motion recognition. That is, a user's motion analysis result may be used not in a single way but in an interactive way where a user's activity is shown in association with contents.

Also, a user's motion analysis result may be stored as a life story showing a child's growth such as activity, change in weight, change in stature, etc.

Also, a user's motion analysis result may not limited to drawing of a picture but may alternatively make the drawn picture as an animation.

Also, a user's motion analysis result may show an integrated profile on a screen by sensing and automatically storing various activities such as running, moving, walking, photographing, etc.

As described above, a motion recognition method according to one or more exemplary embodiments accurately senses not only a user's activity in front but also his/her foot position, thereby sensing the position and motion of the foot as well as a gesture of an upper body.

In particular, the activity of the whole body is effectively sensed in front of a TV or similar screen, and it is thus possible to produce a game or recreational, health care, and educational content.

According to an exemplary embodiment, a user's arm motion, body gesture, and foot motion are accurately recognized and thus applicable to game control, face recognition, measurement of the amount of exercise or activity, measurement of weight, record of a child's activity and growth, and animation.

The methods according to the above-described example embodiments may be recorded in non-transitory computer-readable media including program instructions to implement various operations embodied by hardware-based device such as a computer or processor. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer or processor using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the motion recognition apparatus described herein.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of determining a motion type of a body of a user among a plurality of motion types of the body of the user using multifaceted sensing, the method comprising:
   photographing, by a camera, images of the user having a motion;
   measuring, by a plurality of pressure and position sensors installed apart from each other at a predetermined distance and in the form of a matrix on a floor, a floor contact position, a floor contact area, and a floor contact pressure of the user, the plurality of pressure and position sensors comprising identical sensors;
   identifying, by way of a processor, characteristics of the motion of the body based on at least one of the measured floor contact position, the measured floor contact area, and the measured floor contact pressure of the user; and
   identifying, by way of the processor, the motion type of the body corresponding to the identified characteristics of the motion of the body among the plurality of motion types of the body identified based on the photographed images, the plurality of motion types of the body being different from each other.

2. The method according to claim 1, wherein the plurality of pressure and position sensors are arranged at a predetermined interval on a mattress.

3. The method according to claim 1, wherein the identifying the motion type of the body is performed in one of a computer, a server, and a display apparatus.

4. The method according to claim 3, wherein a result from identifying the motion type of the body is applied to an image of the user or a content object displayed on the display apparatus.

5. The method according to claim 1, wherein the identifying the motion type of the body is performed by combining two or more among changes in the photographed images of the user, the floor contact position, the floor contact area, and the floor contact pressure over time.

6. The method according to claim 5, wherein the change in the floor contact position over time is used in analyzing a horizontal activity of the user.

7. The method according to claim 5, wherein the change in the floor contact area over time is used in analyzing a balance of the user.

8. The method according to claim 5, wherein the change in the floor contact pressure over time is used in analyzing a moved height of the user.

9. The method according to claim 1, wherein a result from identifying the motion type of the body is applied to one among measurement of an user's weight, face recognition, gesture recognition, measurement of moving speed, measurement of an exercise amount, and a game control signal.

10. An apparatus for determining a motion type of a body of a user among a plurality of motion types of the body of the user, the apparatus comprising:
a camera to photograph images of the user having the motion;
a plurality of pressure and position sensors configured to be installed apart from each other at a predetermined distance and in the form of a matrix on a floor and to measure a floor contact position, a floor contact area and a floor contact pressure of the user, the plurality of pressure and position sensors comprising identical sensors; and
a motion analyzer configured to identify characteristics of the motion of the body based on at least one of the measured floor contact position, the measured floor contact area, and the measured floor contact pressure of the user, and to identify the motion type of the body corresponding to the identified characteristics of the motion of the body among the plurality of motion types of the body identified based on the photographed images, the plurality of motion types of the body being different from each other.

11. The apparatus according to claim 10, wherein the plurality of pressure and position sensors are arranged at a predetermined interval on a mattress.

12. The apparatus according to claim 10, wherein the motion analyzer is provided in one of a computer, a server, and a display apparatus.

13. The apparatus according to claim 12, wherein a result from identifying the motion type of the body is applied to an image of the user or a content object displayed on the display apparatus.

14. The apparatus according to claim 10, wherein the motion analyzer identifies the motion type of the body by combining two or more among changes in the photographed images of the user, the floor contact position, the floor contact area, and the floor contact pressure over time.

15. The apparatus according to claim 14, wherein the change in the floor contact position over time is used in analyzing horizontal activity of the user.

16. The apparatus according to claim 14, wherein the change in the floor contact area over time is used in analyzing balance of the user.

17. The apparatus according to claim 14, wherein the change in the floor contact pressure over time is used in analyzing moved height of the user.

18. The apparatus according to claim 10, wherein a result from identifying the motion type of the body is applied to one among measurement of an user's weight, face recognition, gesture recognition, measurement of moving speed, measurement of an exercising amount, and a game control signal.

* * * * *